United States Patent
Koschinat

(10) Patent No.: US 7,260,879 B2
(45) Date of Patent: Aug. 28, 2007

(54) WHEEL BEARING ON AN AXLE BODY FOR VEHICLES

(75) Inventor: Hubert B. Koschinat, Hösbach (DE)

(73) Assignee: Otto Sauer, Bessenbach-Keilberg (DE)

(*) Notice: Subject to any disclaimer, the term of this patent is extended or adjusted under 35 U.S.C. 154(b) by 93 days.

(21) Appl. No.: 10/496,132

(22) PCT Filed: Nov. 29, 2002

(86) PCT No.: PCT/EP02/13468

§ 371 (c)(1),
(2), (4) Date: Apr. 19, 2005

(87) PCT Pub. No.: WO03/047883

PCT Pub. Date: Jun. 12, 2003

(65) Prior Publication Data

US 2005/0217113 A1    Oct. 6, 2005

(30) Foreign Application Priority Data

Dec. 4, 2001   (DE) ................. 201 19 640 U

(51) Int. Cl.
*B23P 11/00* (2006.01)
*B60B 35/00* (2006.01)

(52) U.S. Cl. .............. 29/525.11; 29/525.02; 29/434; 29/894.012; 29/894.321; 29/894.322; 301/124.1; 301/132; 301/135

(58) Field of Classification Search .......... 29/894, 29/894.011, 894.012, 434, 525.01, 894.321, 29/894.322, 525.11, 525.02; 301/124.1, 301/126, 131, 132, 134, 135
See application file for complete search history.

(56) References Cited

U.S. PATENT DOCUMENTS

| 2,998,735 | A | * | 9/1961 | Elfes ........................... 475/346 |
| 4,080,003 | A | * | 3/1978 | Boughton ................... 301/125 |
| 4,455,732 | A |   | 6/1984 | Shiets |
| 5,281,005 | A |   | 1/1994 | Schlosser et al. |
| 5,538,330 | A |   | 7/1996 | Ehrlich |
| 6,024,418 | A | * | 2/2000 | Ebert ......................... 301/130 |

(Continued)

FOREIGN PATENT DOCUMENTS

WO    WO 03/047883 A1 *  6/2003
WO    WO 03/047884 A1 *  6/2003

*Primary Examiner*—Essama Omgba
(74) *Attorney, Agent, or Firm*—Wenderoth, Lind & Ponack, L.L.P.

(57) ABSTRACT

The invention concerns a method for mounting a wheel on an axle housing in the form of an axle tube for vehicles, in particular commercial vehicles. The wheel is fixed with, for example, wheel bolts to a wheel hub, pivoting on the axle stub of the axle tube, and the axle stub is clamped on to an end section of the axle tube as a separate component. For simplicity of manufacture and assembly combined with functional durability, it is proposed that the end section of the axle tube is cylindrical on the inside and has at least one longitudinal slit, that the axle stub fits into the end section of the axle tube with an externally corresponding cylindrical connecting section, and that the end section of the axle tube is radially clamped on to the connecting section of the axle stub by means of at least one longitudinally continuously split clamping ring positioned on the end section of the axle tube.

9 Claims, 3 Drawing Sheets

U.S. PATENT DOCUMENTS

| | | | |
|---|---|---|---|
| 6,148,968 A * | 11/2000 | Davison | 188/206 A |
| 6,254,196 B1 * | 7/2001 | Gee | 301/124.1 |
| 6,279,695 B1 * | 8/2001 | Davison | 188/206 A |
| 6,325,463 B1 | 12/2001 | Blessing et al. | |
| 6,439,672 B1 * | 8/2002 | Simon | 301/124.1 |
| 2004/0100144 A1 * | 5/2004 | Naslund et al. | 301/124.1 |
| 2005/0212352 A1 * | 9/2005 | Dantele | 301/124.1 |
| 2006/0001312 A1 * | 1/2006 | MacKarvich | 301/124.1 |

* cited by examiner

WHEEL BEARING ON AN AXLE BODY FOR VEHICLES

BACKGROUND OF THE INVENTION

The invention concerns a method for mounting a wheel on an axle housing in the form of an axle tube for vehicles, in particular commercial vehicles, whereby the wheel is fixed, for example, with wheel bolts to a wheel hub, pivoting on the axle stub of the axle tube, and the axle stub is clamped on to an end section (3) of the axle tube (1) as a component.

For passenger vehicles, a method is known whereby the axle stub is connected to the other part of the axle housing by means of flange connections. The purpose is to shift the interface between wheel, wheel hub and axle housing (i.e., at the wheel bearing) to a location between the axle stub and the axle housing so that if the brake disc needs replacement, the mounting of the wheel (i.e., the wheel bearing) is not affected, because it never needs to be taken out any more. However, such flange connections are not suitable for the absorption of the considerable forces encountered in commercial vehicles.

It has therefore already been proposed to equip the separate axle stub with a conical connecting section which is clamped by means of an axial screw into an inner cone of the end section opening towards the axle end. However, this method of wheel mounting requires considerable manufacturing and assembly effort, and can lead to an undesired expansion of the end section of the axle tube.

SUMMARY OF THE INVENTION

This invention therefore proposes a wheel mounting of the type described which is simple both from a manufacturing and assembly aspect and at the same time functionally durable.

The invention proposes for example that the end section of the axle tube is cylindrical inside and has at least one longitudinal slit, that the axle stub fits into the end section of the axle tube with an externally corresponding cylindrical connecting section, and that the end section of the axle tube is radially clamped onto the connecting section of the axle stub by means of at least one longitudinally continuously split clamping ring positioned on the end section of the axle tube.

The cylindrical fit unlike that of conical surfaces is easier to manufacture, functionally durable and simple to undo. In particular, it does not result in an expansion of the end section of the axle tube which is additionally prevented by the radial clamping action of the clamping ring. Moreover, this wheel mounting can absorb considerably greater forces than the conventional flange connections.

The solution as per this invention is particularly advantageous if, in any case, the indispensable brake body located on the axle housing forms the clamping ring (i.e., the clamping ring is an integral part of the brake body). In this case, the brake body performs a dual function.

Whereas the brake bracket currently in use must be connected with the axle housing by two all-around welded connections, application of the invention merely requires attachment (tack-welding) of the brake bracket to the circumference of the axle tube to secure its position. Extensive welding is obviated. The same applies to a separate clamping ring which in any event must be secured in the correct position on the axle tube.

The clamping ring can, in the most simple case, have a clamping flange traversed by a threaded bolt on either side of the circular slit, whereby the threaded bolt can cooperate with either an internal thread of one clamping flange or with its own nut.

Advantageously, the longitudinal slit of the end section of the axle tube and the circular slit align, whereby they both preferably run axis parallel.

For the full utilization of the maximum clamping force of the threaded bolt without subjecting it to bending stress, the clamping flanges can be interconnected at their extremities by a bridge. In this case, the clamping path is limited to the elastic range of the material of the clamping ring and the brake bracket.

The longitudinal slit of the end section of the axle tube may at its inside extremity end in a slightly wider round perforation in order to securely limit its longitudinal extension.

To additionally secure the axle stub against axial movement it is possible, for example, to position at least one screw radially on the axle tube, whereby on the axle tube a local reinforcement with an internal thread to receive the screw is fitted and the inside end of the screw engages a continuous slot of the axle stub. The local reinforcements may also constitute the end of the longitudinal slits, and they may also be a continuous integral part of the axle tube. The local reinforcement may also be a part of the clamping ring.

In a further development of the invention, the extremity of the axle stub is beaded for the axial securing of the wheel bearing. As with the wheel mounting in accordance with this invention, it is no longer necessary to remove the wheel bearing, and this ensures secure seating of the wheel bearing in the axle stub.

BRIEF DESCRIPTION OF THE DRAWINGS

Further aims, features, advantages and applications of the invention are evident from the following description of embodiments with reference to the drawings. All features described and/or pictorially represented, alone or in any combination, form the subject of the invention, also independent of their summary in individual claims or their cross-references.

DETAILED DESCRIPTION OF THE INVENTION

Figure 1:
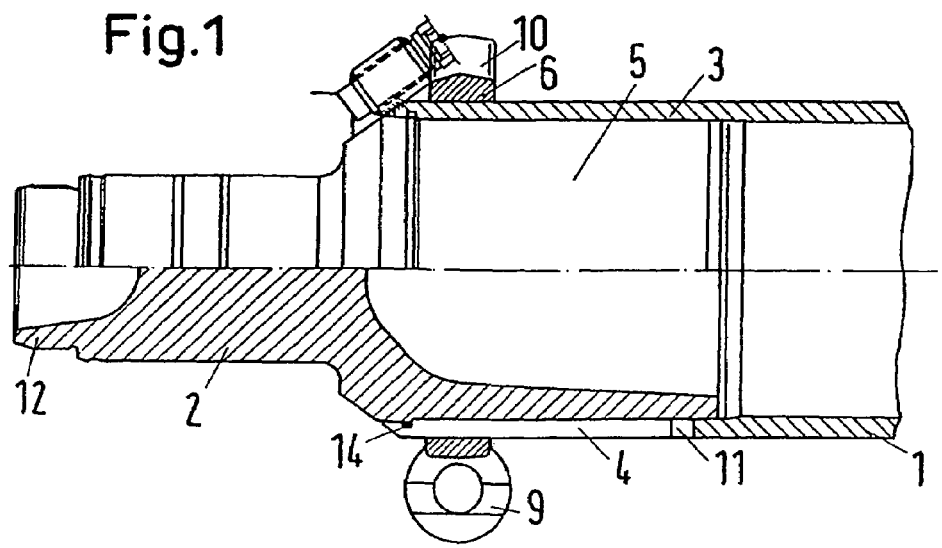
FIG. 1 shows an embodiment of the wheel mounting as per the present invention, partly sectional and broken away.

As shown in FIG. 1 the wheel mounting as per the present invention is applied to an axle housing in the form of an axle tube 1 for vehicles, particularly commercial vehicles. With this method of wheel mounting, the wheel (not shown) is attached for example by means of wheel bolts (also not shown) to a wheel hub (not shown) pivoting on the axle stub 2 of the axle tube 1. The axle stub 2 is radially clamped on to the end section 3 of the axle tube 1 as a separate component. For this purpose, the inside of the end section 3 of the axle tube 1 is cylindrical. The end section 3 has at least one axis parallel longitudinal slit 4. The axle stub 2 fits into the end section 3 of the axle tube 1 with an externally and also cylindrical connecting section 5, whereby the end section 3 of the axle tube 1 is radially clamped on to the connecting section 5 of the axle stub 2 by means of at least one longitudinally continuously split clamping ring 6 positioned on the end section 3 of the axle tube 1. In the case illustrated here, the clamping ring 6 is an integral part of the brake bracket 10. A threaded bolt 8 cooperating with two eyelike clamping flanges 9, 9, serves to clamp the brake bracket 10 on the end section 3 of the axle tube 1 and thereby clamp the end section 3 of the axle tube 1 to the connecting section 5 of the axle stub 2. Because of the clamping effect of the brake bracket 10 achieved on the axle tube 1, extensive all-around welding of the brake bracket 10 on the axle tube 1 is not necessary. It only requires attachment for positioning, preferably in an area opposite the longitudinal slit 4 so as not to interfere with the clamping of the end section 3.

Figure 2:
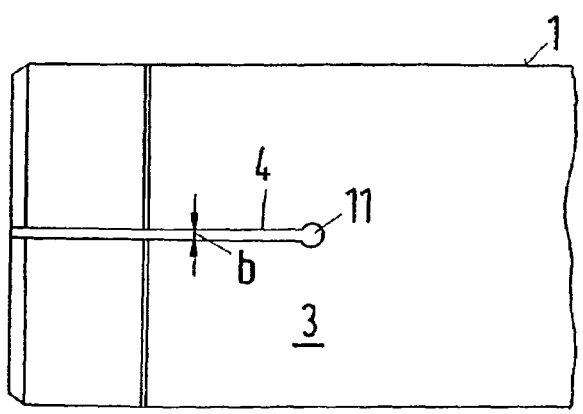
FIG. 2 shows a view of the axle tube with a longitudinal slit in its end section as per the present invention.

As can be seen from FIG. 2, the slit 4 of width b ends in a slightly wider round perforation 11 in order to prevent tearing of the longitudinal slit 4.

Figure 3:
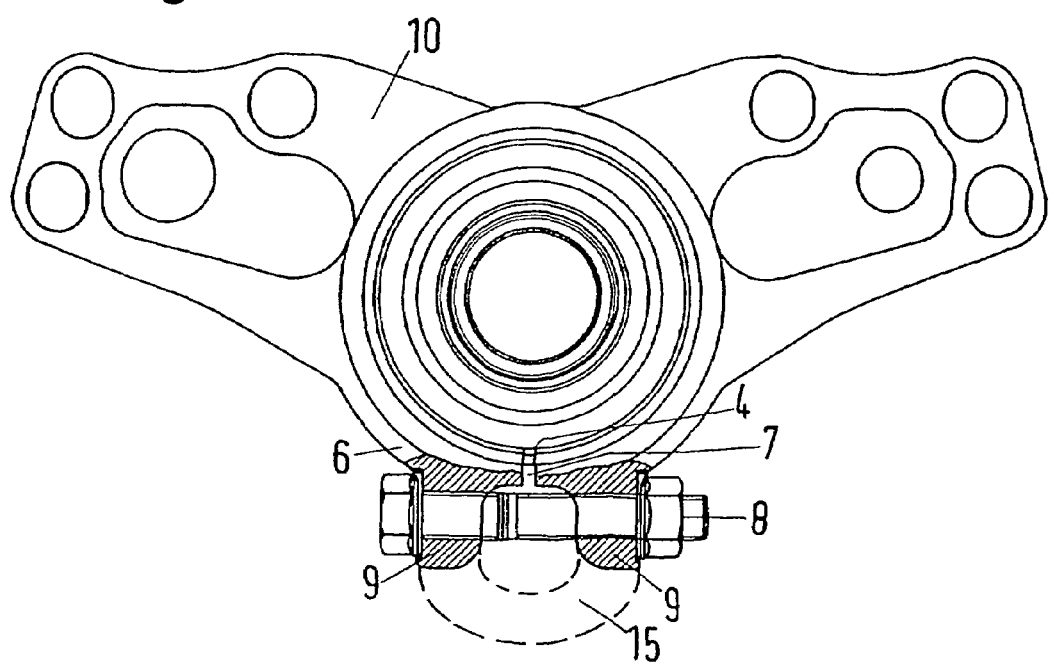
FIG. 3 is a frontal view of a brake bracket with a continuous circular slit and which is radially mountable on an axle tube as per the present invention.

As can be seen from FIG. 3, the axis parallel longitudinal slit 4 of the end section 3 of the axle tube 1 and a likewise axis parallel circular slit 7 are aligned so that attachment of the brake bracket 10 to the outer circumference of the axle tube 1 does not adversely affect the radial clamping effect.

FIG. 3 also shows that the clamping flanges 9 may be interconnected at their extremities by a bridge 15 to obtain maximum effects of the clamping force of the threaded bolt 8.

Figure 4:
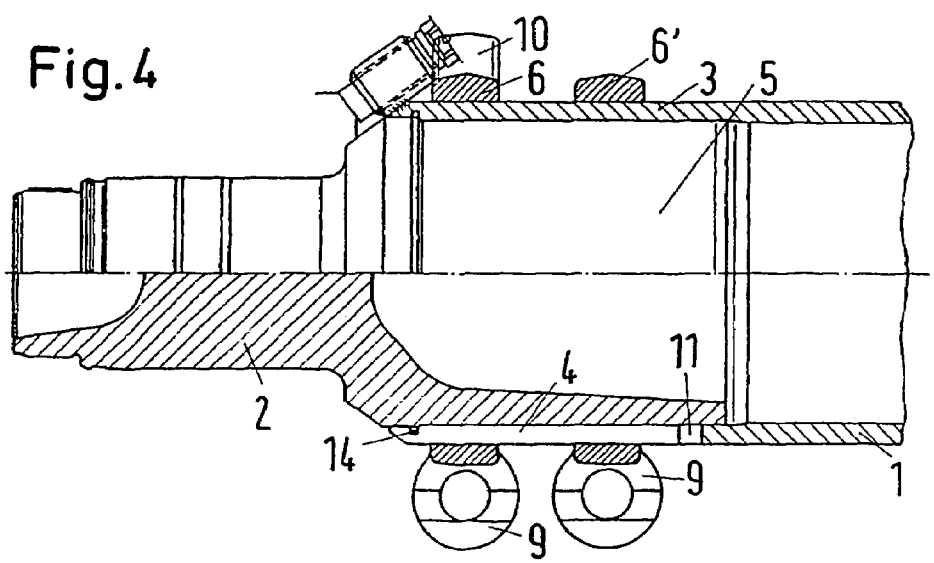
FIG. 4 shows an alternative for a method for wheel mounting as per the present invention in representations corresponding to FIG. 1.
Figure 5:
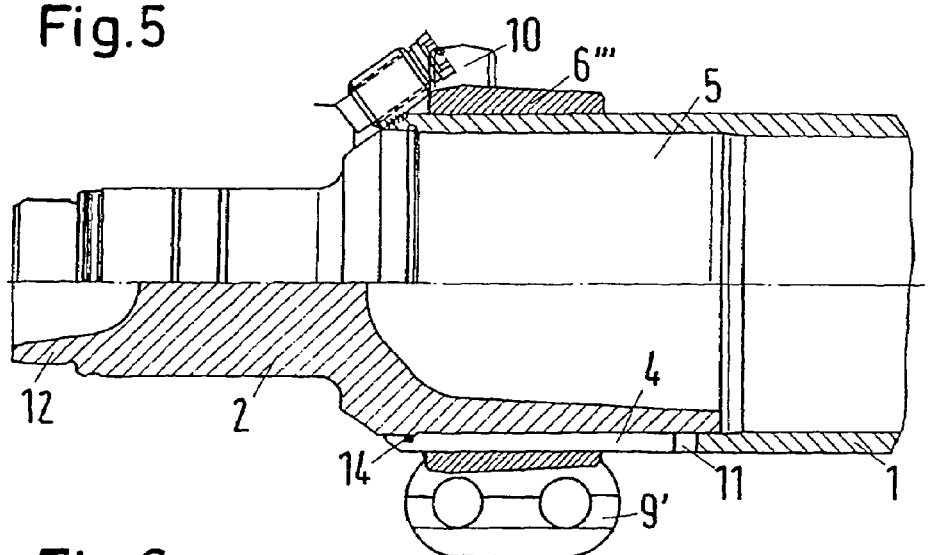
FIG. 5 shows an alternative for a method for wheel mounting as per the present invention cooresponding to FIG. 1.

FIG. 4 shows by way of example that apart from the use of a single (first) clamping ring 6 independent of the brake bracket 10, it is possible to use next to the brake bracket 10 a further (second) clamping ring 6' mounted an axial distance from the first clamping bracket 6 on the axle tube 1. As FIG. 5 shows, it is also possible to axially extend the sole clamping ring 6 as a component of the brake bracket 10 (i.e., provide a single extended clamping ring). Both measures serve to distribute the clamping force over the length of the slit end section 3 of the axle tube 1.

Figure 6:
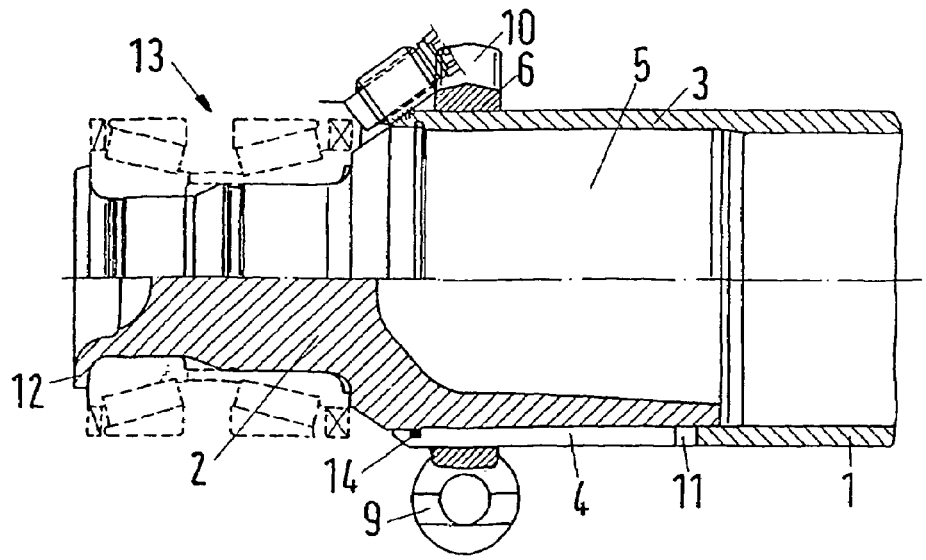
FIG. 6 shows an alternative for a method for wheel mounting as per the present invention cooresponding to FIG. 1.

Based on the embodiment in FIG. 6, it is shown that the extremity 12 of the axle stub 2 may be beaded to axially secure the wheel bearing 13. This guarantees that the wheel bearing 13 is permanently secured in its axial position.

An O-ring 14 may be used to prevent the penetration of moisture between the connecting section 5 of the axle stub 2 and the end section 3 of the axle tube. Furthermore, it is possible to provide an anticorrosive coating in that area. All non-welded gaps may also be sealed with a permanently elastic compound after assembly.

Figure 7:
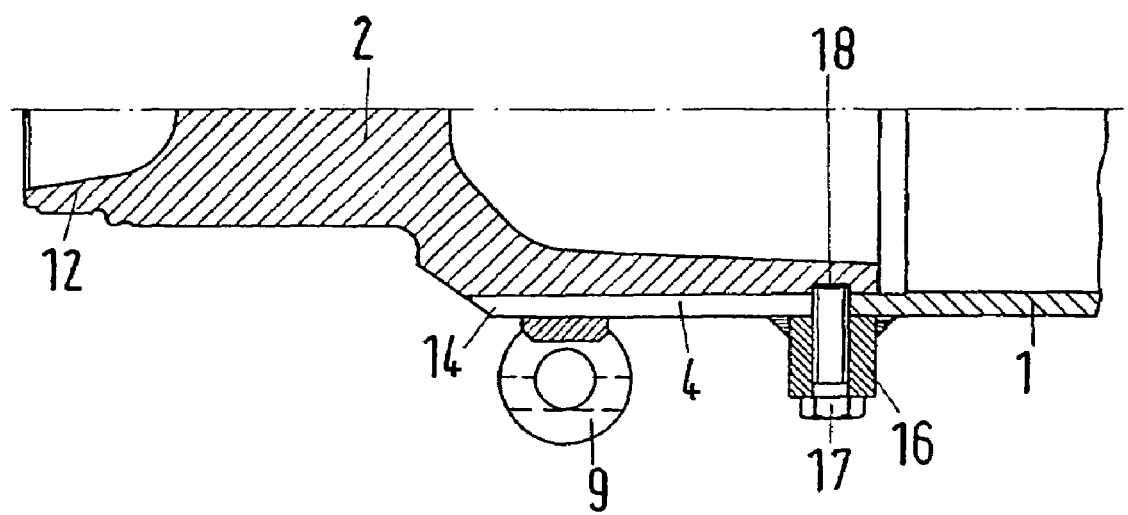
FIG. 7. is a partial sectional view of an alternative for a method for wheel mounting as per the present invention.

FIG. 7 shows an embodiment of a device for securing the axle stub 2 to the end section 3 of the axle tube 1. It consists of a reinforcement 16 welded to the axle tube 1 with a screw 17 inserted in an internal thread, whereby in its security position the inside end of the screw 17 extends into a continuous slot 18 of the axle stub 2 which in the case shown coincides with the area of the widened perforation 11 at the end of the slit 4.

LIST OF REFERENCE NUMBERS

1 Axle tube
2 Axle stub
3 End section of axle tube 1
4 Longitudinal slit
5 Connecting section
6,6',6" Clamping ring
7 Circular slit
8 Threaded bolt,
9,9' Clamping flange
10 Brake bracket
11 Perforation
12 Extremity of axle stub 2
13 Wheel bearing
14 O-ring
15 Bridge
16 Local reinforcement
17 Securing element (screw)
18 Slot

The invention claimed is:

1. A method of mounting a wheel on an axle housing in the form of an axle tube for vehicles, said method comprising:
   fixing the wheel with wheel bolts to a wheel hub pivoting on an axle stub of the axle tube;
   clamping the axle stub on to an end section of the axle tube as a separate component, wherein an inside of the end section of the axle tube is cylindrical and has at least one longitudinal slit;
   fitting the axle stub into the end section of the axle tube with an externally corresponding cylindrical connecting section; and
   radially clamping the end section of the axle tube on to the connecting section of the axle stub by at least one longitudinally continuously split clamping ring positioned on the end section of the axle tube.

2. The method of wheel mounting as claimed in claim 1, wherein the clamping ring is a part of a brake bracket.

3. The method of wheel mounting as claimed in claim 1, further comprising attaching the clamping ring tack-welding for positioning on the end section of the axle tube.

4. The method of wheel mounting as claimed in claim 1, further comprising aligning the at least one longitudinal slit of the end section of the axle tube with a circular slit.

5. The method of wheel mounting as claimed in claim 1, wherein the clamping ring has a clamping flange traversed by a threaded bolt on either side of a circular slit.

6. The method of wheel mounting as claimed in claim 5, further comprising interconnecting the clamping flanges by a bridge.

7. The method of wheel mounting as claimed in claim 1, wherein the at least one longitudinal slit of the end section of the axle tube ends in a slightly wider round perforation at its inside end.

8. The method of wheel mounting as claimed in claim 1, further comprising providing a device for securing the axle stub on the end section of the axle tube.

9. The method of wheel mounting as claimed in claim 1, wherein the axle stub is beaded at its extremity for axially securing a wheel bearing.

* * * * *